Patented June 26, 1934

1,964,399

UNITED STATES PATENT OFFICE 1,964,399

PROCESS FOR THE CONVERSION OF UN-SATURATED HYDROCARBONS SUCH AS ACETYLENE INTO HIGHER BOILING PRODUCTS

Max Hofsäsz, Amsterdam, Netherlands, assignor, by mesne assignments, to Shell Development Company, San Francisco, Calif., a corporation of Delaware No Drawing. Application November 2, 1929, Serial No. 404,521. In the Netherlands November 13, 1928

9 Claims. (Cl. 260—168)

The invention concerns a process of converting acetylene by polymerization, into higher boiling products.

The polymerization of acetylene, on theoretical grounds should be favourably influenced by an increase of pressure but no appreciable pressure can be applied because, on reaching a pressure of two atmospheres, it shows a tendency to explosive disintegration. In consequence of this disintegration the temperature rises to about 3000° C., whereby the pressure increases enormously.

This difficulty can be partly overcome by diluting the gas with hydrogen, coal gas, oil gas and the like. According to J. H. Vogel and A. Schulze (Carbid und Acetylen Leipzig 1924, page 8) a mixture of 30% acetylene and 70% oil gas can support a pressure of 15 atmospheres without the danger of explosion. It is evident, however, that such a dilution considerably reduces the economic yield of the process and makes it difficult to obtain quantitatively the hydrocarbons formed, particularly the low-boiling ones. Moreover the risk of explosion, although less, still remains.

Now the process according to the invention makes it possible in a surprising manner to polymerize acetylene, under pressure without danger of the gas exploding.

In principle, the process according to the invention consists in carrying out the polymerization in the presence of an explosion suppressing liquid medium which remains inert during the reaction.

The yield of the products of polymerization is, as remarked above, favourably influenced by increased pressure. It has been found that if care is taken to ensure a thorough mixing of liquid with hydrocarbon in vapour or gaseous form the reaction, takes place better than when a diluent is used in the gaseous form; which is probably to be attributed to the higher specific heat and better heat conductibility of the liquid medium. Further it has been found that such liquids promote catalytically the polymerization of the acetylene in a high degree: whereas, for instance, without a liquid and under atmospheric pressure, polymerization begins at about 500° C., with the process according to the invention it can take place even at 300° C., practically all the acetylene being converted without a trace of carbon separation.

The acetylene to be polymerized may or may not be mixed with other gases, which may be inert or may participate in the reaction, as for instance ethylene, ammonia and such like gases.

Frequently it may be of advantage to carry out the reaction also in the presence of catalysts.

The acetylene can be introduced into the reaction chamber for instance by means of an injector. A particular form of application of the process according to the invention consists in evolving the acetylene in the reaction chamber itself, which can be done—for instance if continuous condensation of acetylene is aimed at—by introducing fixed calcium carbide in the form of a paste into the high-pressure chamber. The paste should then preferably consist of calcium carbide in powder form finely distributed in the liquid serving as the reaction medium.

Example I

Into a two-litre autoclave provided with a rapid-working stirrer there were added 64 grammes commercial calcium carbide, 40 grammes water (in glass) and 300 grammes decaline. The autoclave was then closed and heated.

At about 320° C. the pressure was 40 atmospheres, which was increased by only 9 atmospheres when the temperature was raised to 440° C. After cooling down to room temperature, 4 litres of gas containing 15% acetylene was run off from the autoclave. From this it follows that of the approximately 20 litres acetylene developed in the reaction chamber, only 0.6 litre remained unconverted. In the working up of this liquid mixture in the autoclave it appeared that the acetylene had been polymerized to liquid products with boiling points ranging between about 60 and 230° C. The decaline had remained practically unchanged.

Example II

The autoclave was charged with the same quantities as in Example I, but after this was closed ethylene was introduced until the pressure reached 25 atmospheres. Again in this case the polymerizing reaction began at about 320° and ended at about 400° C. From the approximately 20 grammes acetylene developed in the autoclave and the 36 grammes ethylene introduced, there were obtained 50 grammes of polymerization products which were characterized by a high content of low-boiling unsaturated hydrocarbons.

I claim as my invention:

1. A process of polymerizing acetylene into higher boiling products, which comprises treating acetylene at superatmospheric pressures at least equal to the pressure at which acetylene becomes explosive and at elevated temperatures, conducive to the formation of polymerization products of acetylene, with a liquid medium which remains inert during the reaction, sufficient quantity of the medium being used to insure presence of a substantial amount of the medium in the liquid state throughout the reaction.

2. A process of polymerizing acetylene into higher boiling products, which comprises treating acetylene at superatmospheric pressures at least equal to the pressure at which acetylene becomes explosive and at an elevated temperature exceeding 300° C., conducive to the formation of polymerization products of acetylene, with an explosion suppressing liquid medium which remains inert during the reaction, sufficient quantity of the medium being used to insure presence of a substantial amount of the medium in the liquid state throughout the reaction.

3. A process of polymerizing acetylene into higher boiling products, which comprises treating acetylene at superatmospheric pressures at least equal to the pressure at which acetylene becomes explosive and at an elevated temperature exceeding 300° C., conducive to the formation of polymerization products of acetylene, with an amount of decaline sufficient to insure the presence of decaline in liquid form throughout the reaction.

4. A process of polymerizing acetylene into higher boiling products, which comprises treating acetylene at superatmospheric pressures at least equal to the pressure at which acetylene becomes explosive and at an elevated temperature exceeding 300° C., conducive to the formation of polymerization products of acetylene, with an amount of decaline sufficient to insure the presence of decaline in liquid form throughout the reaction, and adding ethylene during an early stage of the reaction.

5. A process of polymerizing acetylene into higher boiling products, which comprises treating acetylene, at a pressure of 40-50 atmospheres and at a temperature of 320-440° C., in a closed vessel with an explosion suppressing liquid which remains inert during the reaction, sufficient quantity of the liquid being used to insure presence of a substantial amount of the liquid throughout the reaction.

6. A process of polymerizing actylene into higher boiling products, which comprises treating acetylene-forming materials, at a pressure of 40-50 atmospheres and at a temperature of 320-440° C., in a closed vessel with an explosion suppressing liquid which remains inert during the reaction, sufficient quantity of the liquid being used to insure presence of a substantial amount of the liquid throughout the reaction.

7. A process of polymerizing acetylene into higher boiling products, comprising treating acetylene at superatmospheric pressures at least equal to the pressure at which acetylene becomes explosive and at temperatures, conducive to the formation of polymerization products of acetylene, with an explosion suppressing liquid medium which remains inert during the reaction, the liquid medium being added in a sufficient quantity to insure presence of a substantial amount thereof in the liquid state throughout the reaction, and adding a reactive gas at an early stage of the reaction.

8. A process of polymerizing acetylene into higher boiling products, which comprises treating acetylene at a pressure of 40-50 atmospheres and at a temperature of 320-440° C., in a closed vessel with liquid decaline which remains inert during the reaction, a sufficient quantity of the liquid being used to insure presence of a substantial amount of the liquid throughout the reaction.

9. A process of polymerizing acetylene into higher boiling products, which comprises treating acetylene-forming materials at a pressure of 40-50 atmospheres and at a temperature of 320-440° C., in a closed vessel with liquid decaline which remains inert during the reaction, a sufficient quantity of the liquid being used to insure presence of a substantial amount of the liquid throughout the reaction.

MAX HOFSÄSZ.